(12) United States Patent
Feng et al.

(10) Patent No.: US 11,905,880 B2
(45) Date of Patent: Feb. 20, 2024

(54) POWER GENERATION APPARATUS AND POWER SYSTEM

(71) Applicant: Yantai Jereh Petroleum Equipment & Technologies Co., Ltd., Yantai (CN)

(72) Inventors: Ning Feng, Yantai (CN); Ting Zhang, Yantai (CN); Jianglei Zou, Yantai (CN); Haibo Zhang, Yantai (CN); Ligong Wu, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 0 days.

(21) Appl. No.: 17/727,842

(22) Filed: Apr. 25, 2022

(65) Prior Publication Data

US 2022/0389865 A1 Dec. 8, 2022

(30) Foreign Application Priority Data

Jun. 4, 2021 (CN) .......................... 202110625071.0
Sep. 17, 2021 (CN) .......................... 202111094887.1
Mar. 22, 2022 (WO) ................ PCT/CN2022/082253

(51) Int. Cl.
*F02C 6/00* (2006.01)
*F02C 9/00* (2006.01)
*H02K 7/18* (2006.01)

(52) U.S. Cl.
CPC .................. *F02C 6/00* (2013.01); *F02C 9/00* (2013.01); *H02K 7/1823* (2013.01); *F05D 2220/76* (2013.01)

(58) Field of Classification Search
CPC . F02C 6/00; F02C 9/00; H02K 7/1823; F05D 2220/76
See application file for complete search history.

(56) References Cited

U.S. PATENT DOCUMENTS

| 2018/0080376 | A1 | 3/2018 | Austin et al. | |
| 2021/0257944 | A1* | 8/2021 | Hach ........................ | H02J 1/102 |
| 2022/0185404 | A1* | 6/2022 | Jaramillo ............. | H02K 7/1823 |

FOREIGN PATENT DOCUMENTS

| CN | 110145399 | * | 5/2019 | ................ B66F 7/16 |
| CN | 110145399 A | | 8/2019 | |
| CN | 110735713 A | | 1/2020 | |
| CN | 112682172 A | | 4/2021 | |

\* cited by examiner

*Primary Examiner* — Joseph Ortega
(74) *Attorney, Agent, or Firm* — XSENSUS LLP

(57) ABSTRACT

A power generation apparatus and a power system are provided. The power generation apparatus includes a first transportation means, a gas turbine and a generator, the first transportation means has a first platform, a first housing is provided on the first platform, the gas turbine is arranged in the first housing and has a first input terminal and a first output terminal, the generator is arranged in the first housing and has a second input terminal and a second output terminal, the first output terminal is connected with the second input terminal.

17 Claims, 3 Drawing Sheets

POWER GENERATION APPARATUS AND POWER SYSTEM

The present application claims priority of Chinese Patent Application No. 202110625071.0 filed on Jun. 4, 2021, priority of Chinese Patent Application No. 202111094887.1 filed on Sep. 17, 2021, and priority of PCT Application No. PCT/CN2022/082253 filed on Mar. 22, 2022, the disclosure of which are incorporated herein by reference in their entirety as part of the present application.

TECHNICAL FIELD

Embodiments of the present disclosure relate to a power generation apparatus and a power system.

BACKGROUND

A gas turbine is an internal combustion engine that can convert, in a form of rotational power, chemical energy of fuel into mechanical energy, and the mechanical energy can be used to power various industrial processes, for example, electricity generation is one of the most important applications thereof. The gas turbine has advantages such as small size, light weight, high reliability, low operating cost, high power density, and ability to run on clean and renewable energy, thereby reducing carbon emission. For example, in a combined heat and power process, the gas turbine used can increase efficiency of a power plant by using exhaust gas to further generate steam; and these benefits of gas turbines, along with stricter carbon emission standards, will promote demands for gas turbines in the coming years.

SUMMARY

At least one embodiment of the present disclosure provides a power generation apparatus, the power generation apparatus includes a first transportation means, a gas turbine, and a generator, the first transportation means has a first platform, a first housing is provided on the first platform, the gas turbine is arranged in the first housing and has a first input terminal and a first output terminal, and the generator is arranged in the first housing and has a second input terminal and a second output terminal, the first output terminal is connected with the second input terminal.

For example, in the power generation apparatus provided by at least one embodiment of the present disclosure, the first output terminal and the second input terminal are connected through a coupling.

For example, the power generation apparatus provided by at least one embodiment of the present disclosure further comprises an exhaust passage, which is arranged in the first housing and located between the gas turbine and the generator, the gas turbine further comprises an exhaust terminal, and the exhaust passage is connected with the exhaust terminal to exhaust gas for the gas turbine.

For example, in the power generation apparatus provided by at least one embodiment of the present disclosure, the exhaust passage comprises a volute exhaust structure, the volute exhaust structure comprises an annular housing, and the annular housing comprises a central passage and a first exhaust opening, the coupling passes through the central passage to connect the first output terminal and the second input terminal, and the annular housing surrounds the coupling.

For example, in the power generation apparatus provided by at least one embodiment of the present disclosure, the first exhaust opening faces away from the first platform.

For example, in the power generation apparatus provided by at least one embodiment of the present disclosure, the volute exhaust structure is spaced apart from the gas turbine.

For example, in the power generation apparatus provided by at least one embodiment of the present disclosure, the exhaust passage further comprises an extended exhaust structure, the extended exhaust structure has a second exhaust opening and a third exhaust opening that are opposite to each other, and the second exhaust opening is in communication with the first exhaust opening; opening sizes of the second exhaust opening and the first exhaust opening are substantially same, and an opening size of the third exhaust opening is greater than the opening size of the second exhaust opening.

For example, in the power generation apparatus provided by at least one embodiment of the present disclosure, the exhaust passage further comprises an auxiliary exhaust structure, and the auxiliary exhaust structure has a fourth exhaust opening, the first housing has an exhaust passage mounting opening, the auxiliary exhaust structure is in detachable connection with the extended exhaust structure through the exhaust passage mounting opening, and the fourth exhaust opening is in communication with third exhaust opening; opening sizes of the fourth exhaust opening and the third exhaust opening are substantially same.

For example, in the power generation apparatus provided by at least one embodiment of the present disclosure, the extended exhaust structure is in a cone tube shape, and the auxiliary exhaust structure is a cylindrical structure.

For example, the power generation apparatus provided by at least one embodiment of the present disclosure further comprises an inlet passage, which is at least arranged on a side of the gas turbine away from the first platform and being in communication with the first input terminal of the gas turbine.

For example, in the power generation apparatus provided by at least one embodiment of the present disclosure, the inlet passage extends from an end of the first housing away from the generator and extends above the gas turbine.

For example, in the power generation apparatus provided by at least one embodiment of the present disclosure, the first transportation means comprises at least one of a semi-trailer, a trailer, a truck, a skid, and a barge, the second output terminal of the generator faces a rear portion of the first transportation means.

For example, the power generation apparatus provided by at least one embodiment of the present disclosure further comprises: a generator control device, configured to be in communicative connection with the generator for monitoring and controlling an operation state of the generator; and a gas turbine control device, configured to be in communicative connection with the gas turbine for monitoring and controlling an operation state of the gas turbine.

For example, in the power generation apparatus provided by at least one embodiment of the present disclosure, a side surface of the first housing is provided with a plurality of doors, and the plurality of doors respectively correspond to different portions of the gas turbine and the generator.

For example, in the power generation apparatus provided by at least one embodiment of the present disclosure, central axes of the gas turbine and the generator are provided along a length direction of the first transportation means, and the second output terminal of the generator faces a rear portion of the first transportation means.

At least one embodiment of the present disclosure provides a power system, the power system comprises the power generation apparatus provided by any one of the embodiments of the present disclosure and a power distribution apparatus, the power distribution apparatus comprises a second transportation means and a power distribution device; the second transportation means has a second platform, a second housing is provided on the second platform, the power distribution device is provided in the second housing, the power distribution device has a third input terminal, and the third input terminal is configured to be electrically connected with the second output terminal of the generator.

For example, in the power system provided by at least one embodiment of the present disclosure, an exhaust passage arrangement region is further provided on the second platform, and the exhaust passage arrangement region is configured to place at least a portion of the exhaust passage.

For example, in the power system provided by at least one embodiment of the present disclosure, the power distribution device comprises a frequency inverter, a voltage transformer, a power distribution cabinet, and a monitor and control device, the monitor and control device is configured to respectively be in communicative connection with the frequency inverter, the voltage transformer, and the power distribution cabinet to respectively monitor and control operation states of the frequency inverter, the voltage transformer, and the power distribution cabinet.

For example, in the power system provided by at least one embodiment of the present disclosure, the second transportation means comprises at least one of a semi-trailer, a trailer, a truck, a skid, and a barge.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

Figure 1:
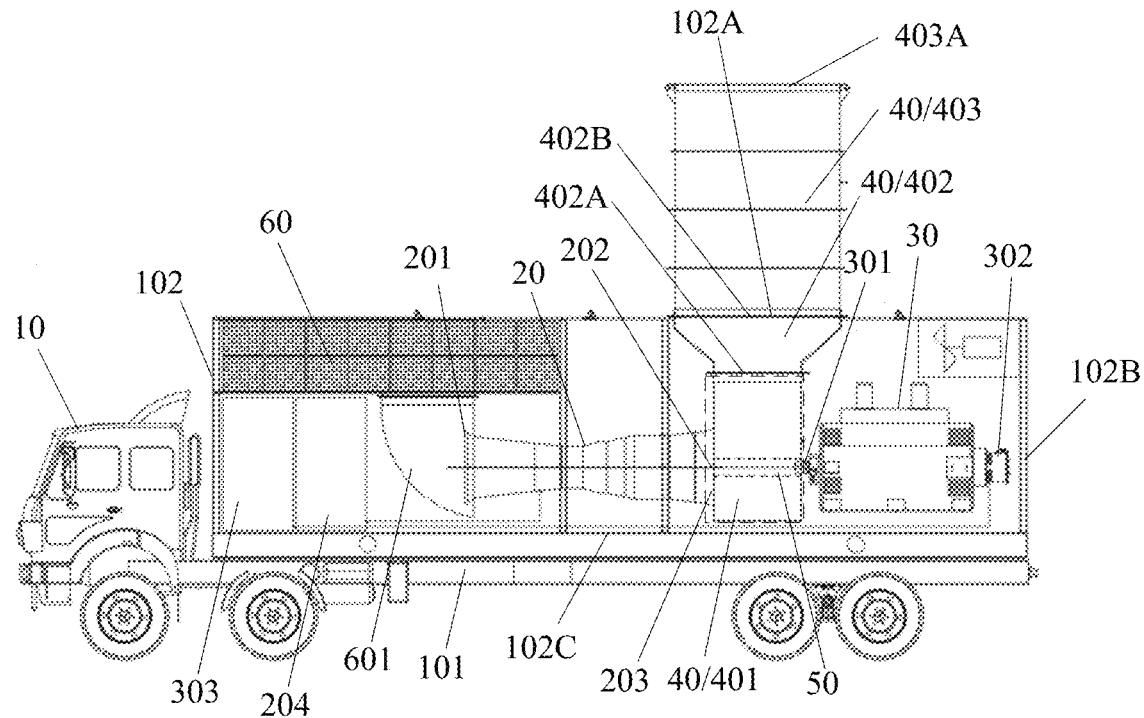
FIG. 1 is a side view of a power generation apparatus provided by at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

As described above, the gas turbine can be used for power generation; for example, the gas turbine can directly use natural gas as fuel, and use fluid (e.g., gas) to impinge impellers to rotate for power generation; in this case, an arrangement mode and a connection mode of a gas turbine and a power generation apparatus seriously affects power generation efficiency and application scope of the power generation apparatus.

At least one embodiment of the present disclosure provides a power generation apparatus and a power system; the power generation apparatus includes a first transportation means, a gas turbine, and a generator; the first transportation means has a first platform, and a first housing is provided on the first platform; the gas turbine is arranged in the first housing and has a first input terminal and a first output terminal; and the generator is arranged in the first housing and has a second input terminal and a second output terminal; the first output terminal is connected with the second input terminal.

In the above-described power generation apparatus provided by the embodiments of the present disclosure, by arranging the gas turbine and the generator in the same transportation means, relative positions of the gas turbine and the generator can be fixed, so that a stable connection between the gas turbine and the generator can be implemented in a simple connection mode, to avoid complicated procedures caused by repeated mounting and dismounting; moreover, by the same transportation means, the gas turbine and the generator can be moved to a position where power generation is required, so that mobile power generation can be implemented simply and conveniently.

The power generation apparatus and the power system of the present disclosure will be described below through several specific embodiments.

Figure 2:
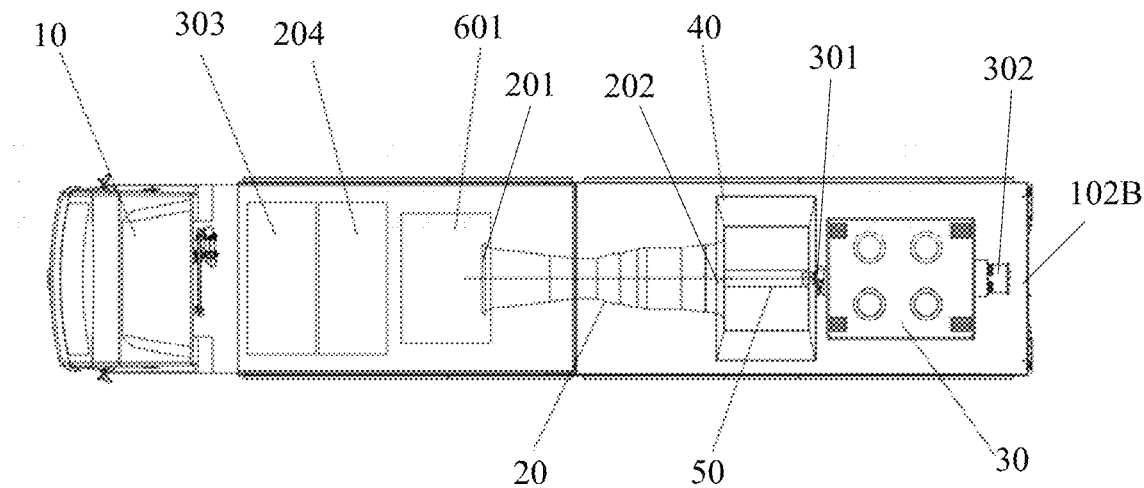
FIG. 2 is a top view of a power generation apparatus provided by at least one embodiment of the present disclosure.

At least one embodiment of the present disclosure provides a power generation apparatus. FIG. 1 shows a side view of the power generation apparatus; and FIG. 2 shows a top view of the power generation apparatus. As shown in FIG. 1 and FIG. 2, the power generation apparatus includes a first transportation means 10, a gas turbine 20, a generator 30, and so on.

For example, the first transportation means 10 has a first platform 101, the first platform 101 is provided thereon with a first housing 102, and the gas turbine 20 is provided in the first housing 102 and has a first input terminal 201 and a first output terminal 202. For example, the first input terminal 201 is a fluid (e.g., gas) input terminal, and the first output terminal 202 is a motive power output terminal for outputting motive power.

For example, the generator 30 is arranged in the first housing 102 and has a second input terminal 301 and a second output terminal 302; for example, the second input terminal 301 is a motive power input terminal, and the second output terminal 302 is an electric power output terminal, for outputting electric energy. For example, the first output terminal 202 of the gas turbine 20 is connected with the second input terminal 301 of the generator 30, so that the generator 30 can acquire motive power output by the gas turbine 20 and convert the motive power into electric power for outputting.

In the embodiments of the present disclosure, the gas turbine and the generator are arranged in the same transportation means (i.e., the above-described first transportation means), so that by the same transportation means, the gas turbine and the generator can be moved to a position where power generation is required, so as to implement mobile power generation simply and conveniently.

For example, in some embodiments, the first transportation means 10 may adopt at least one of a semi-trailer, a trailer, a truck, a skid, and a barge; and the specific form of the first transportation means 10 is not limited by the embodiments of the present disclosure. The above-described first housing 102 may be a carriage box of the above-described first transportation means 10, and the first platform 101 may be a bottom surface of the carriage box.

In addition, in the embodiments of the present disclosure, by arranging the gas turbine and the generator in the same transportation means, the relative positions of the gas turbine and the generator can be fixed, so that a stable connection between the gas turbine and the generator can be implemented in a simple connection mode, to avoid complicated use procedures caused by repeated mounting and dismounting.

For example, in some embodiments, as shown in FIG. 1 and FIG. 2, the first output terminal 202 and the second input terminal 301 may be connected through a coupling 50 without a mechanical device such as a gearbox, which can simplify the connection structure of the gas turbine and the generator. For example, in some examples, both ends of the coupling 50 are respectively in detachable connection with the first output terminal 202 of the gas turbine 20 and the second input terminal 301 of the generator 30 through bolts or splines.

For example, in some embodiments, as shown in FIG. 1 and FIG. 2, the power generation apparatus may further include an exhaust passage 40, the exhaust passage 40 is arranged in the first housing 102, and is located between the gas turbine 20 and the generator 30. For example, the gas turbine 20 further includes an exhaust terminal 203, and the exhaust passage 40 is connected with the exhaust terminal 203, for example, through flanges, etc., to exhaust gas for the gas turbine 20, for example, exhaust gas from the gas turbine 20.

Figure 3:
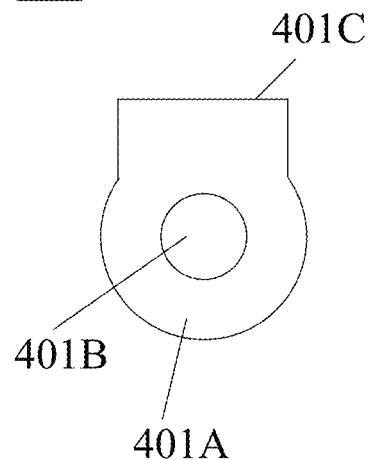
FIG. 3 is a structural schematic diagram of a volute exhaust structure in a power generation apparatus provided by at least one embodiment of the present disclosure.

For example, in some embodiments, as shown in FIG. 1, the exhaust passage may include a volute exhaust structure 401 (a portion shown by a dashed box), for example, FIG. 3 shows a front view of the volute exhaust structure 401; in conjunction with FIG. 1 and FIG. 3, the volute exhaust structure 401 includes an annular housing 401A, the annular housing 401A includes a central passage 401B and a first exhaust opening 401C; the coupling 50 passes through the central passage 401B to connect the first output terminal 202 of the gas turbine 20 and the second input terminal 301 of the generator 30; and in this case, the annular housing 401A surrounds the coupling 50.

As a result, the volute exhaust structure 401 forms an arrangement passage for the coupling 50, and the volute exhaust structure 401 can facilitate the connection between the gas turbine 20 and the generator 30 while fully exhausting gas for the gas turbine 20, so that the overall connection structure of the gas turbine 20 and the generator 30 is more compact, which can reduce the overall space occupied by the gas turbine 20, the exhaust passage 40 and the generator 30, and can reduce a size of the first housing 102, thereby facilitating transportation, or transportation just by a small transportation means.

For example, in some embodiments, the volute exhaust structure 401 may be connected to the first housing 102 by means of bolts, etc.; and the first exhaust opening 401C of the volute exhaust structure 401 faces away from the first platform 101, for example, the first exhaust opening 401C is upward in FIG. 1 and FIG. 3, so as to facilitate delivery of gas discharged from the gas turbine 20 to a farther location and avoid affecting environment around the first transportation means 10.

For example, in some embodiments, as shown in FIG. 1 and FIG. 2, the volute exhaust structure 401 and the generator 30 may be spaced apart, thereby preventing heat of the exhaust gas in the volute exhaust structure 401 from adversely affecting the generator 30.

For example, in some embodiments, as shown in FIG. 1, the exhaust passage 40 may further include an extended exhaust structure 402, and the extended exhaust structure 402 has a second exhaust opening 402A and a third exhaust opening 402B that are opposite to each other, and the second exhaust opening 402A is in communication with the first exhaust opening 401C. For example, opening sizes of the second exhaust opening 402A and the first exhaust opening 401C are substantially the same, thereby facilitating the connection between the second exhaust opening 402A and the first exhaust opening 401C. An opening size of the third exhaust opening 402B is greater than the opening size of the second exhaust opening 402A. For example, in some examples, the third exhaust opening 402B is flush with an upper surface of the first housing 102.

For example, in some embodiments, as shown in FIG. 1, the exhaust passage 40 may further include an auxiliary exhaust structure 403, the auxiliary exhaust structure 403 has a fourth exhaust opening 403A, the first housing 102 has an exhaust passage mounting opening 102A, and the auxiliary exhaust structure 403 is in detachable connection with the extended exhaust structure 402 through the exhaust passage mounting opening 102A. For example, the fourth exhaust opening 403A is in communication with the third exhaust opening 402B, and opening sizes of the fourth exhaust opening 403A and the third exhaust opening 402B are substantially the same, thereby facilitating the connection between the fourth exhaust opening 403A and the third exhaust opening 402B. For example, an opening size of the exhaust passage mounting opening 102A is slightly greater than the opening size of the fourth exhaust opening 403A, so as to facilitate mounting and dismounting of the auxiliary exhaust structure 403.

In the embodiments of the present disclosure, the extended exhaust structure 402 implements connection of different diameters; by designing the opening size of the third exhaust opening 402B to be greater than the opening size of the second exhaust opening 402A, a size of the entire gas discharge opening of the exhaust passage 40 is enlarged, that is, a gas flow rate discharged from the exhaust passage 40 per unit time is increased, so that excessive pressure and excessive heat of a large amount of gas in the exhaust passage 40 can be avoided.

For example, in some examples, the extended exhaust structure 402 is in a cone tube shape, the auxiliary exhaust structure 403 is a cylindrical structure, and the auxiliary exhaust structure 403 and the extended exhaust structure 402 may be connected by a structure such as a flange or a bolt. For example, a structure such as a sealing ring may also be provided between the auxiliary exhaust structure 403 and the extended exhaust structure 402, so that the auxiliary exhaust structure 403 and the extended exhaust structure 402 are in sealed connection.

In the embodiments of the present disclosure, the auxiliary exhaust structure 403 can further guide gas exhausted from the gas turbine 20 to a farther position, so as to avoid affecting environment around the first transportation means 10.

For example, in some embodiments, respective portions of the exhaust passage 40, for example, the volute exhaust structure 401, the extended exhaust structure 402, and the auxiliary exhaust structure 403, may be made of materials with high temperature resistance and good thermal conductivity, for example, metal materials, such as copper, aluminum, or alloy materials thereof; and the specific material of the exhaust passage 40 is not limited by the embodiments of the present disclosure.

For example, in some embodiments, as shown in FIG. 1 and FIG. 2, the power generation apparatus may further include an inlet passage 60, and the inlet passage 60 is at least provided on a side of the gas turbine 20 away from the first platform 101, for example, is in communication with the first input terminal 201 of the gas turbine 20 through an inlet pipeline 601, to supply gas to the gas turbine 20.

For example, in some examples, the inlet passage 60 may extend from an end of the first housing 102 away from the generator 30, for example, extend above the gas turbine 20, thereby forming a longer inlet passage 60 to supply enough gas to the gas turbine 20. The inlet pipeline 601 is respectively in sealed connection with the inlet passage 60 and the first input terminal 201 of the gas turbine 20; for example, the inlet pipeline 601 may have an arc shape to guide flow of combustion-supporting gas and reduce pressure loss.

For example, in some examples, the inlet passage 60 may also be provided therein with an inlet filter and muffler device and a ventilation filter and muffler device (not shown); the inlet filter and muffler device is used to filter ambient air, to supply combustion-supporting gas to the gas turbine 20, and to treat noise in a position of the gas inlet of the gas turbine 20, thereby avoiding environmental pollution. The ventilation filter and muffler device is used to filter ambient air, to supply gas for ventilation and cooling to the gas turbine 20, and to treat noise in the inlet passage 60, thereby avoiding environmental pollution.

For example, in some embodiments, as shown in FIG. 1 and FIG. 2, the power generation apparatus may further include a generator control device 303 and the generator control device 303 is configured to be in communicative connection with the generator 30, for example, in a wired or wireless manner, for monitoring and controlling an operation state of the generator 30. For example, the power generation apparatus may further include a gas turbine control device 204; the gas turbine control device 204 is configured to be in communicative connection with the gas turbine 20, for example, in a wired or wireless manner, for monitoring and controlling an operation state of the gas turbine 20. Thus, device automation can be implemented and safety of the apparatus can be improved.

For example, in some embodiments, as shown in FIG. 1, a side surface of the first housing 102 may have a plurality of doors; one door 102C is shown in the diagram as an example; and the plurality of doors may respectively correspond to different portions of the gas turbine 20, the exhaust passage 40 and the generator 30, thereby facilitating inspection and maintenance of different portions of the gas turbine 20, the exhaust passage 40 and the generator 30 through the plurality of doors.

For example, in some embodiments, as shown in FIG. 1 and FIG. 2, central axes of the gas turbine 20 and the generator 30 are provided along a length direction of the first transportation means; the second output terminal 302 of the generator 30 faces a rear portion of the first transportation means; and in this case, the rear portion of the first housing 102 has a connection opening or a door 102B, so as to electrically connect the second output terminal 302 of the generator 30 with other device/circuit to supply electric energy.

Figure 4:
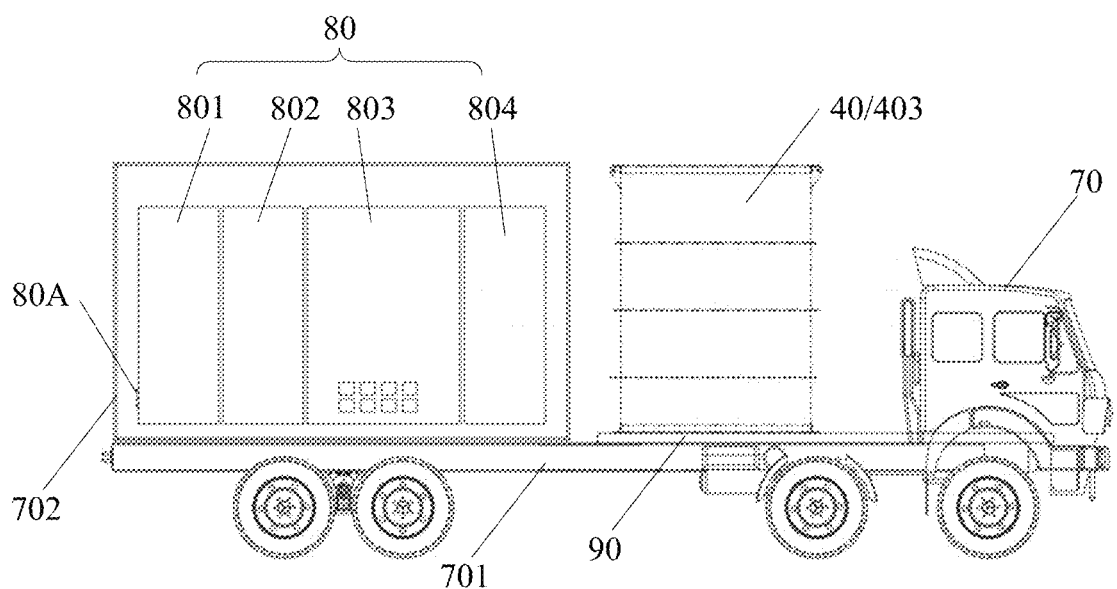
FIG. 4 is a side view of a power distribution apparatus provided by at least one embodiment of the present disclosure.
Figure 5:
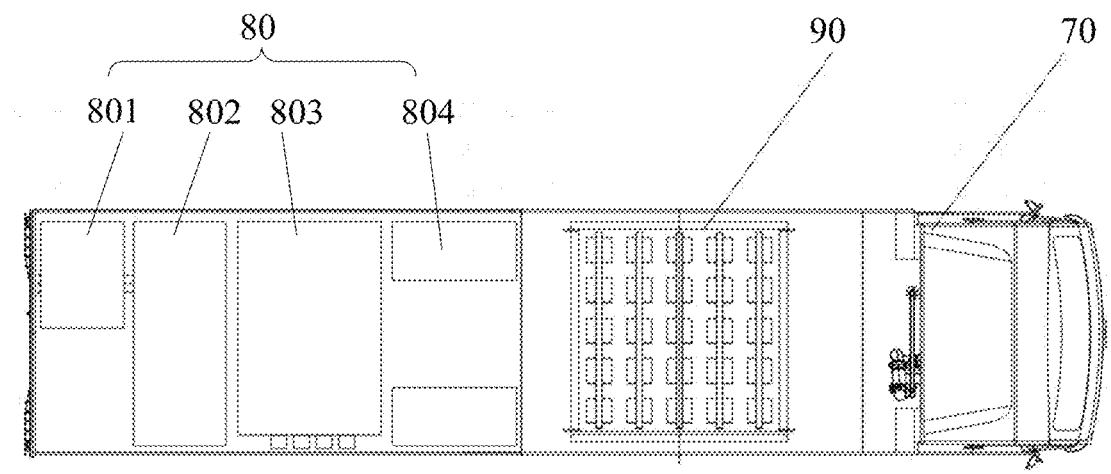
FIG. 5 is a top view of a power distribution apparatus provided by at least one embodiment of the present disclosure.
Figure 6:
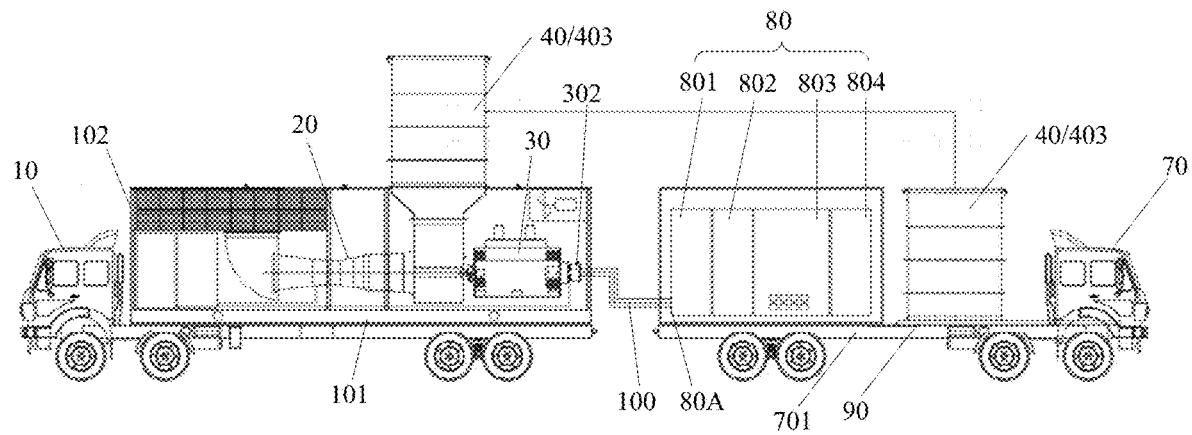
FIG. 6 is a side view of a power system provided by at least one embodiment of the present disclosure.

At least one embodiment of the present disclosure further provides a power system, the power system includes the power generation apparatus provided by the embodiments of the present disclosure and a power distribution apparatus; for example, FIG. 4 shows a side view of the power distribution apparatus; FIG. 5 shows a side view of the power distribution apparatus; FIG. 6 shows a side view of the power system, and FIG. 7 shows a top view of the power system.

Figure 7:
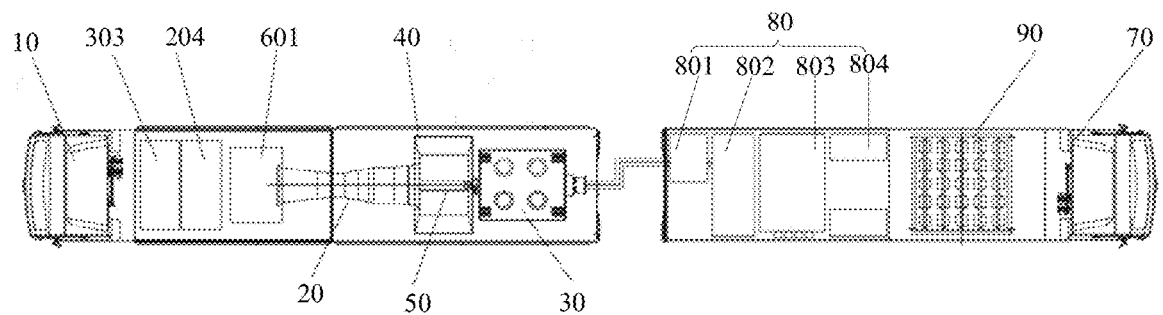
FIG. 7 is a top view of a power system provided by at least one embodiment of the present disclosure.

For example, as shown in FIG. 4 and FIG. 5, the power distribution apparatus includes a second transportation means 70 and a power distribution device 80; the second transportation means 70 has a second platform 701, the second platform 701 is provided thereon with a second housing 702; the power distribution device 80 is provided in the second housing 702, the power distribution device 80 has a third input terminal 80A, the third input terminal 80A is configured to be electrically connected with the second output terminal 302 of the generator 30, for example, through a conductive cable 100, so as to acquire electric energy from the generator 30, as shown in FIG. 6 and FIG. 7.

For example, in some embodiments, as shown in FIG. 4 and FIG. 5, the power distribution device 80 may include a frequency inverter 801, a voltage transformer 802, a power distribution cabinet 803, and a monitor and control device 804, etc., so that the power distribution apparatus 80 may regulate frequency, voltage, etc. of power output by the generator 30, to convert a non-standard electrical system output by the generator 30 into a standard electrical system required by customers. For example, the monitor and control device 804 is configured to respectively be in communicative connection with the frequency inverter 801, the voltage transformer 802, and the power distribution cabinet 803, for example, in a wired or wireless manner, so as to respectively monitor and control operation states of the frequency inverter 801, the voltage transformer 802, and the power distribution cabinet 803, for example, to adjust an output frequency of the frequency inverter 801, and to adjust an output voltage of the voltage transformer 802 and a power distribution mode of the power distribution cabinet 803, etc.

For example, in some embodiments, the second transportation means 70 may also adopt at least one of a semi-trailer, a trailer, a truck, a skid, and a barge; and the specific form of the second transportation means 70 is not limited by the embodiments of the present disclosure. The above-described second housing 702 may be a carriage box of the above-described second transportation means 70, and the second platform 701 may be a bottom surface of the carriage box.

For example, in some embodiments, as shown in FIG. 4 and FIG. 5, the second platform 701 is further provided thereon with an exhaust passage arrangement region 90, which is configured to place at least a portion of the exhaust passage 40, for example, place the auxiliary exhaust structure 403. For example, the exhaust passage arrangement region 90 may have a groove matching a shape of the auxiliary exhaust structure 403, and therefore the auxiliary exhaust structure 403 may be stably arranged on the exhaust passage arrangement region 90 by being snapped into the groove. Therefore, after the auxiliary exhaust structure 403 is dismounted from the extended exhaust structure 402, the auxiliary exhaust structure 403 may be placed in the exhaust passage arrangement region 90 of the second platform 701, and can be transported by the second transportation means 70.

For example, before using the above-described power system, the auxiliary exhaust structure 403 may be pre-placed in the exhaust passage arrangement region 90 of the second transportation means 70 to be transported by the second transportation means 70. When using the above-described power system, firstly, the first transportation means 10 may be parked in a required position with a rear of the transportation means facing the power distribution apparatus 80; meanwhile, the second transportation means 70 may be parked in a required position with a rear of the transportation means facing the generator 30; then, the rears of the first transportation means 10 and the second transportation means 70 may be connected with each other by means of two flange faces coupled with each other, so as to keep relative positions of the first transportation means 10 and the second transportation means 70 stable.

Thereafter, the auxiliary exhaust structure 403 placed in the exhaust passage arrangement region 90 may be taken out and mounted on the extended exhaust structure 402 on the first transportation means 10, for example, the auxiliary exhaust structure 403 may be moved to a roof of the first transportation means 10 with a tool such as a crane, to be connected with the extended exhaust structure 402. For example, in some embodiments, a hoisting device may be integrated on the second transportation means 70, thereby reducing on-site deployment work and improving efficiency. Thereafter, the cable 100 is used to connect the third input terminal 80A of the power distribution device 80 and the second output terminal 302 of the generator 30, so that the electric power output by the generator 30 can be distributed by the power distribution device 80.

In the embodiments of the present disclosure, the power generation apparatus and the power distribution apparatus may also be connected and used in other modes other than the modes according to the above-described embodiments, which are not specifically limited in the embodiments of the present disclosure, and no details are repeated here.

The following statements should be noted.

(1) The accompanying drawings involve only the structure(s) in connection with the embodiment(s) of the present disclosure, and other structure(s) can be referred to common design(s).

(2) For the purpose of clarity, in accompanying drawings for illustrating the embodiment(s) of the present disclosure, the thickness of a layer or a region may be enlarged or narrowed, that is, the drawings are not drawn in a real scale.

(3) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

The invention claimed is:

1. A power generation apparatus, comprising:
   a first transportation means, having a first platform, wherein a first housing is provided on the first platform,
   a gas turbine, arranged in the first housing and having a first input terminal and a first output terminal, and
   a generator, arranged in the first housing and having a second input terminal and a second output terminal,
   an exhaust passage, arranged in the first housing and located between the gas turbine and the generator,
   wherein the first output terminal is connected with the second input terminal, and the generator is disposed rearmost on the first platform,
   the first output terminal and the second input terminal are connected through a coupling,
   the exhaust passage comprises a volute exhaust structure, the volute exhaust structure comprises an annular housing, and the annular housing comprises a central passage and a first exhaust opening, and
   the coupling passes through the central passage to connect the first output terminal and the second input terminal, and the annular housing surrounds the coupling.

2. The power generation apparatus according to claim 1, wherein the gas turbine further comprises an exhaust terminal, and the exhaust passage is connected with the exhaust terminal to exhaust gas for the gas turbine.

3. The power generation apparatus according to claim 1, wherein the first exhaust opening faces away from the first platform.

4. The power generation apparatus according to claim 1, wherein the volute exhaust structure is spaced apart from the generator.

5. The power generation apparatus according to claim 1, wherein the exhaust passage further comprises an extended exhaust structure, the extended exhaust structure has a second exhaust opening and a third exhaust opening that are opposite to each other, and the second exhaust opening is in communication with the first exhaust opening;
   opening sizes of the second exhaust opening and the first exhaust opening are substantially same, and an opening size of the third exhaust opening is greater than the opening size of the second exhaust opening.

6. The power generation apparatus according to claim 5, wherein the exhaust passage further comprises an auxiliary exhaust structure, and the auxiliary exhaust structure has a fourth exhaust opening,
   the first housing has an exhaust passage mounting opening, the auxiliary exhaust structure is in detachable connection with the extended exhaust structure through the exhaust passage mounting opening, and the fourth exhaust opening is in communication with third exhaust opening;
   opening sizes of the fourth exhaust opening and the third exhaust opening are substantially same.

7. The power generation apparatus according to claim 6, wherein the extended exhaust structure is in a cone tube shape, and the auxiliary exhaust structure is a cylindrical structure.

8. The power generation apparatus according to claim 1, further comprising:
an inlet passage, at least arranged on a side of the gas turbine away from the first platform and being in communication with the first input terminal of the gas turbine.

9. The power generation apparatus according to claim 8, wherein the inlet passage extends from an end of the first housing away from the generator and extends above the gas turbine.

10. The power generation apparatus according to claim 1, wherein the first transportation means comprises at least one of a semi-trailer, a trailer, a truck, a skid, and a barge, the second output terminal of the generator faces a rear portion of the first transportation means.

11. The power generation apparatus according to claim 1, further comprising:
a generator control device, configured to be in communicative connection with the generator for monitoring and controlling an operation state of the generator; and
a gas turbine control device, configured to be in communicative connection with the gas turbine for monitoring and controlling an operation state of the gas turbine.

12. The power generation apparatus according to claim 1, wherein a side surface of the first housing is provided with a plurality of doors, and the plurality of doors respectively correspond to different portions of the gas turbine and the generator.

13. The power generation apparatus according to claim 1, wherein central axes of the gas turbine and the generator are provided along a length direction of the first transportation means, and the second output terminal of the generator faces a rear portion of the first transportation means.

14. A power system, comprising:
the power generation apparatus according to claim 1, and
a power distribution apparatus, comprising a second transportation means and a power distribution device; wherein the second transportation means has a second platform, a second housing is provided on the second platform, the power distribution device is provided in the second housing, the power distribution device has a third input terminal, and the third input terminal is configured to be electrically connected with the second output terminal of the generator.

15. The power system according to claim 14, wherein an exhaust passage arrangement region is further provided on the second platform, and the exhaust passage arrangement region is configured to place at least a portion of the exhaust passage.

16. The power system according to claim 14, wherein the power distribution device comprises a frequency inverter, a voltage transformer, a power distribution cabinet, and a monitor and control device,
the monitor and control device is configured to respectively be in communicative connection with the frequency inverter, the voltage transformer, and the power distribution cabinet to respectively monitor and control operation states of the frequency inverter, the voltage transformer, and the power distribution cabinet.

17. The power generation apparatus according to claim 14, wherein the second transportation means comprises at least one of a semi-trailer, a trailer, a truck, a skid, and a barge.

* * * * *